(12) United States Patent
Srinivasalureddy et al.

(10) Patent No.: US 10,810,061 B2
(45) Date of Patent: Oct. 20, 2020

(54) SYSTEM AND METHODS OF ENHANCED DATA RELIABILITY OF INTERNET OF THINGS SENSORS TO PERFORM CRITICAL DECISIONS USING PEER SENSOR INTERROGATION

(71) Applicant: Hewlett Packard Enterprise Development LP, Houston, TX (US)

(72) Inventors: Jeevan Srinivasalureddy, Bangalore (IN); Ganesh Lokanath, Bangalore (IN); Thippeswamy Jangamara Hosalli Mathad, Bangalore (IN); Madhu Bhandimata, Bangalore (IN); Sudharshan Ramaiah, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/269,200

(22) Filed: Feb. 6, 2019

(65) Prior Publication Data

US 2020/0250016 A1    Aug. 6, 2020

(51) Int. Cl.
*G06F 15/173*    (2006.01)
*G06F 9/54*      (2006.01)
(Continued)

(52) U.S. Cl.
CPC .......... *G06F 9/542* (2013.01); *G06F 11/1608* (2013.01); *H04L 67/104* (2013.01); *H04L 67/125* (2013.01)

(58) Field of Classification Search
CPC .... G06F 9/542; G06F 11/1608; H04L 67/104; H04L 67/125
See application file for complete search history.

(56) References Cited

U.S. PATENT DOCUMENTS 6,687,637 B2     2/2004  Garabedian
9,384,656 B2 *   7/2016  Patterson ............. G08B 29/185
(Continued)

OTHER PUBLICATIONS

HPE, "HPE Universal IoT Platform", Deliver Value with your IoT Platform, available online at <https://www.hpe.com/in/en/solutions/iot-platform.html>, retrieved in 2019, 8 pages.
(Continued)

*Primary Examiner* — Jonathan A Bui
(74) *Attorney, Agent, or Firm* — Sheppard Mullin Richter & Hampton LLP

(57) ABSTRACT

Methods and systems for enhanced data reliability for sensor devices, such as Internet of Things (IoT) sensors can include a first set of sensor devices (e.g., primary sensors) for collecting data in accordance with an application program. A second set of sensor devices (peer sensors) can be enabled for collecting supplemental data. Each of the sensor devices in the second set of sensor devices corresponds to one of the sensor devices in the first set of sensor devices. After receiving data from a selected sensor device of the set of first sensor devices and determining that the received data triggers a notification for a critical event, a second sensor of the second set of sensor devices can be interrogated to confirm the critical event. The event is confirmed by a convergence of data from the selected sensor device and the supplemental data from the second sensor device.

20 Claims, 5 Drawing Sheets

(51) Int. Cl.
*G06F 11/16* (2006.01)
*H04L 29/08* (2006.01)

(56) References Cited

U.S. PATENT DOCUMENTS

| | | | | |
|---|---|---|---|---|
| 10,152,336 | B2* | 12/2018 | Kohlenberg | G06F 9/44505 |
| 10,313,779 | B2* | 6/2019 | Boesen | H04R 1/1041 |
| 10,499,124 | B1* | 12/2019 | Natanzon | H04Q 9/02 |
| 2008/0165001 | A1* | 7/2008 | Drake | G08B 29/24 |
| | | | | 340/550 |
| 2008/0262798 | A1* | 10/2008 | Kim | H04L 67/12 |
| | | | | 702/189 |
| 2014/0222813 | A1 | 8/2014 | Yang et al. | |
| 2014/0375466 | A1 | 12/2014 | Reiter | |
| 2017/0163750 | A1* | 6/2017 | Sullivan | H04L 67/22 |
| 2017/0251347 | A1* | 8/2017 | Mehta | H04W 4/08 |
| 2017/0277962 | A1* | 9/2017 | Kudo | A61B 5/0402 |
| 2018/0012479 | A1* | 1/2018 | Seaton | H04L 12/2823 |
| 2018/0063709 | A1* | 3/2018 | Morrison | H04W 12/06 |
| 2018/0101149 | A1* | 4/2018 | Moss | H04W 4/70 |
| 2018/0121623 | A1* | 5/2018 | Boesen | G16H 80/00 |
| 2018/0200552 | A1* | 7/2018 | Wertsberger | A62C 37/44 |
| 2018/0310159 | A1* | 10/2018 | Katz | H04M 3/5116 |
| 2019/0068461 | A1* | 2/2019 | Barkie | H04L 41/5009 |
| 2019/0138423 | A1* | 5/2019 | Agerstam | H04L 41/16 |

OTHER PUBLICATIONS

Sharma et al., "Sensor Faults: Detection Methods and Prevalence in Real-World Datasets", ACM Transactions on Sensor Networks, vol. 6 (3), Jun. 2010, 40 pages.

OneM2M, "OneM2M Technical Specification", Functional Architecture, Jan. 30, 2015, TS-0001-V1.6.1, pp. 1-321.

Kung, H.T., A Spectral Clustering Approach to Validating Sensors via Their Peers in Distributed Sensor Networks, (Research Paper). Retrieved Oct. 19, 2018, 7 Pgs.

Mattera, C.G. et al., A practical Approach to Validation of Buildings' Sensor Data: a Commissioning Experience Report, (Research Paper), 2017, 6 Pgs.

* cited by examiner

SYSTEM AND METHODS OF ENHANCED DATA RELIABILITY OF INTERNET OF THINGS SENSORS TO PERFORM CRITICAL DECISIONS USING PEER SENSOR INTERROGATION

DESCRIPTION OF RELATED ART

The Internet of Things (IoT) can refer to a system or network of devices or items that are provided with unique identifiers that allow them to transfer data over a network. These objects may be embedded with sensors that enable these objects to collect and exchange data. For example, one IoT model connects sensors over wireless connections to a cloud service that manages the sensors and collects traffic. The wireless connections may be established, for example, over a wireless local area network (WLAN).

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
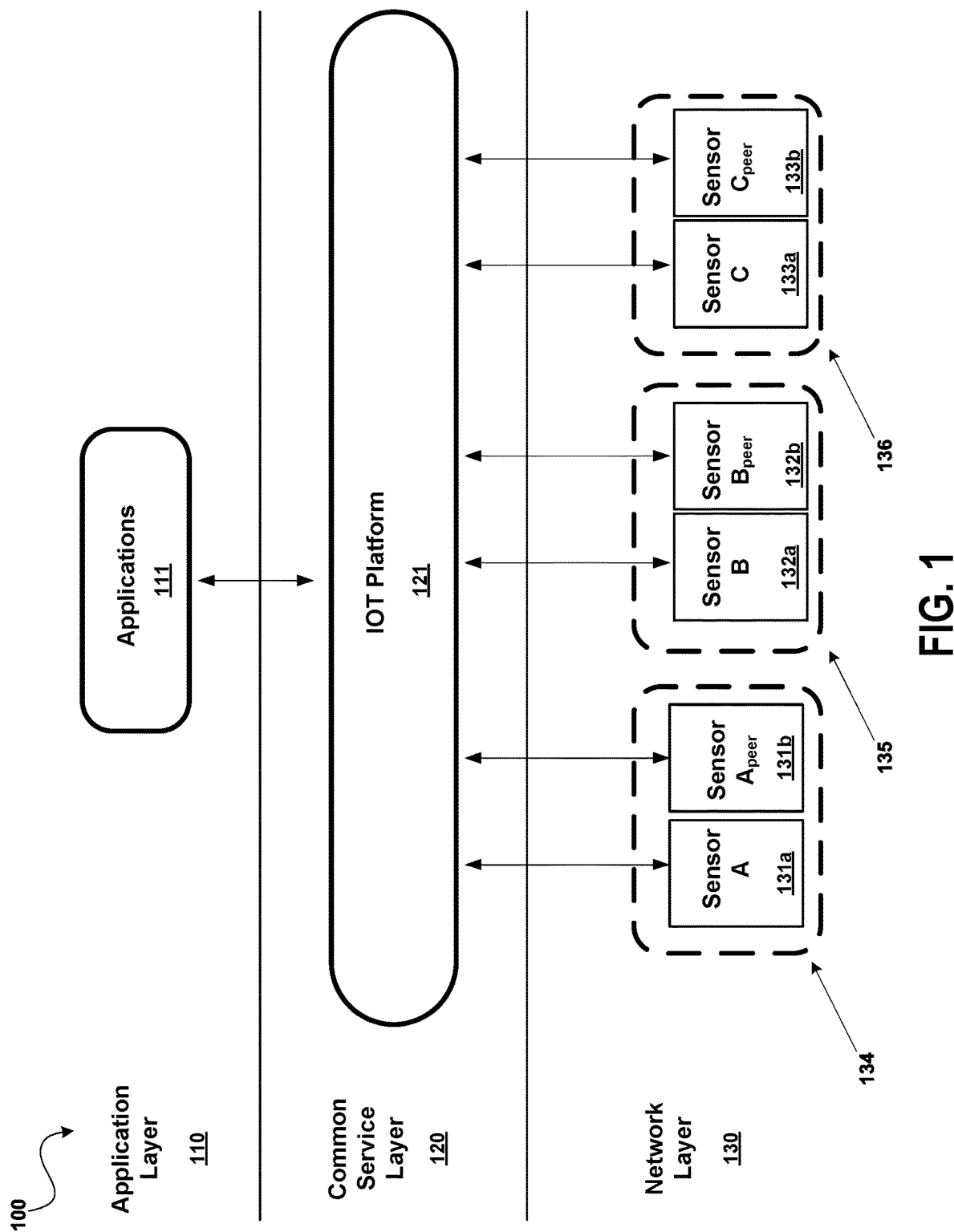
FIG. 1 illustrates an example IoT platform architecture for implementing the peer sensor interrogation techniques for data reliability, according to some embodiments.

The figures are not exhaustive and do not limit the present disclosure to the precise form disclosed.

DETAILED DESCRIPTION

Various embodiments described herein are directed to a method and a system for enhanced data reliability of IoT sensor devices (hereinafter referred to as sensors) using peer sensor interrogation techniques. In some environments, an IoT system includes a group of digital devices, such as industrial sensors, which collect and transmit data via a network, like the Internet. Due to the highly distributed and scalable (set of sensors or digital devices) characteristics of IoT systems, the technology provides organizations with new, innovative ways to manage and monitor far-flung operations. IoT systems often enable remote data collection, that can consistently feed information into applications and data stores. Often times, IoT sensors are low cost and low power consuming devices. Thus, a system of IoT sensors can have scalability (e.g., adaptable number of devices in use) and an ease of deployment that is leveraged for observing and managing activities that may be out of reach of a centralized facility (e.g., higher performance computing devices). With IoT systems, it is possible to gather vast amounts of data that is generated by the connected IoT sensor devices to provide analytical-based insights that deliver value to enterprise applications.

As such, the data collected by IoT sensors is vital to the accuracy and trustworthiness of the applications that consume and analyze the sensor data. Accordingly, the reliability of the sensor data itself is also vital. For example, sensors within an IoT platform architecture should possess capabilities that support that particular applications used by the platform. Furthermore, the sensors should function reliably (e.g., accurate sensor measurements and low error in transmission of data) in order for the applications that utilize data from these sensors to achieve accurate decision making based on the collected data. Nonetheless, various circumstances may arise in real-world applications of IoT systems, such as sensor degradation, that may negatively impact the reliability of data provided by IoT sensor devices. The embodiments employ peer sensor interrogation techniques to address these concerns in a manner that may realize enhanced data reliability. In detail, the embodiments include a distinct arrangement for the sensor devices used within an IoT platform architecture. The sensors available to the IoT platform, in accordance with the embodiments, are principally grouped as a first set of sensor devices, and a second set of sensor devices. The first set of sensor devices (hereinafter referred to as primary sensors) operate mostly using nominal data collection mechanisms, which are often characteristic of IoT devices (e.g., passively transmitting collected data at specified time intervals). The second set of sensor devices in the arrangement are configured to cooperatively function with the first set of sensor devices in a manner that provides additional data which supplements the data obtained by the primary sensors. The second set of sensor devices (hereinafter referred to as peer sensors) can be dedicated to data validation. Restated, the peer sensors are configured to provide their respective sensor data in response to an interrogation, as a mechanism to enhance the reliability of the data obtained from the primary sensors used for critical decisions.

As discussed in greater detail in reference to FIG. 1, the "things" in the Internet of Things may refer to a wide variety of sensor and other electronic devices, such as heart monitoring implants, biochip transponders on farm animals, automobiles with built-in sensors, smart lights, and smart thermostat systems that may allow remote monitoring. It is expected that IoT system may grow to include billions of devices in the near future.

There are many technologies that enable communication between devices in a IoT network, such as Bluetooth Low Energy (BLE), Near Field Communications (NFC), Radio Frequency Identification (RFID), ZigBee, Narrowband IOT (NB-IOT), WiFi (e.g., the various 802.11xx standards), etc. As noted above, devices such as sensors or devices having sensors embedded therein may connect to an IoT network via a WLAN, such as a WiFi network. In order for a sensor to connect to its service in the cloud, the sensor may communicate over, e.g., a WiFi network, and thus is configured to connect to the WiFi network through network discovery procedures. As an example, an access point (AP) in a WiFi-compliant WLAN can receive data by wired Ethernet, perform a conversion to 2.4 GHz or 5 GHz wireless signals, and send/receive wireless traffic to and from nearby wireless clients or devices (e.g., IoT devices and WiFi clients), serving as a WiFi provider, and an IoT service provider.

FIG. 1 illustrates an example IoT platform architecture 100 in which the abovementioned IoT networking may be employed. As shown in FIG. 1, the IoT platform architecture 100 may include three principal segments, or layers, including: application layer 110; common service layer 120; and network layer 130. However, it should be appreciated that the embodiments are not limited to the example architecture of FIG. 1, and can include various layers and have a structure that is not disclosed herein. The network layer 130 can include a plurality of IoT devices, or sensors. As seen in the example, the sensors are generally arranged as groups of two sensor, or sensor pairs, namely sensor pairs 134, 135, and 136. The sensor pairs 134, 135, and 136 can be generally described as including a primary sensor and a peer sensor, as previously described. For example, sensor pair 134 includes primary sensor 131a, "Sensor A" and peer sensor 131b, "Sensor $A_{peer}$." Similarly, sensor pair 135 includes primary sensor 132a, "Sensor B" and peer sensor 132b, "Sensor $B_{peer}$."; and sensor pair 136 includes primary sensor 133a, "Sensor C" and peer sensor 133b, "Sensor $C_{peer}$."

In some implementations, sensor pairs 134, 135, and 136 can be implemented as sensor that are configured to measure a physical quantity relating to a surrounding environment, for example, and convert the physical quantity into a signal. Examples of sensors include but are not limited to temperature sensors; video cameras; audio recorders; motion sensors; humidity sensors; smoke detectors; various gas sensors; radiation monitors; and other sensors. In some aspects, the sensors of sensor pairs 134, 135, and 136 can be smart sensors that include, but are not limited to, processing logic such as one or more controllers or processors, memory, and communication interfaces.

In some embodiments, the sensor pairs 134, 135, and 136 may include their own processing capability to compute results from raw data in a manner that produces additional information that can be provided to IoT platform 121, for instance. In other embodiments, one or more sensors of the sensor pairs 134, 135, and 136 may be data-gathering-only sensors that provide only raw data. In further embodiments, hybrid sensors may be included that provide a combination of raw data and processed data. Each of the sensor pairs 134, 135, and 136 may provide an analog output or a digital output. Additionally, the sensor pairs 134, 135, and 136 can be configured to detect, and/or sense in real-time. As used herein, the term "real-time" means a level of processing responsiveness that a user or system senses as sufficiently immediate for a particular process or determination to be made, or that enables the processor to keep up with some external process. Accordingly, a user can access sensor data, for example vis-à-vis applications 111, that is relevant to the user and/or the user's surroundings using the abovementioned capabilities of sensor pairs 134, 135, and 136. The applications 111 can utilize sensor data made available from sensor pairs 134, 135, and 136 to make critical decisions, as described in greater detail below.

Each of these sensors of sensor pairs, 134, 135, and 136 may wirelessly exchange data (e.g., sensor data) with one or more APs (not shown) to create a WLAN in an office, home, building, etc. by connecting to a wired router, switch or hub via Ethernet, and projecting a WiFi signal to a designated region or area. Ultimately, data from the sensor pairs, 134, 135, 136 may be communicated to an IoT platform 121 (or service) that collects this data in common service layer 120.

The common service layer 120 can include modules that manage any provided IoT service, and the IoT network itself including the devices and sensors connected thereto (e.g., network layer 120). The common service layer 120 can perform management of the applications 111 in the application layer 110, which allows the applications 111 to explore and subscribe to resources that correspond to the underlying IoT network (e.g., sensor pairs 134, 135, and 136 in network layer 130). In some cases, the IoT platform 121 is configured to support a wide range of IoT devices and sensors, over different access technology. Consequently, the IoT platform 121 provides the framework in order for a rich set of applications 111 to be registered, or otherwise used in the IoT platform architecture 100. Applications 111 can be generally described as any application program that may be running on a device associated with an end-user, such as web-based program on a computer system, that can consume data collected by the sensors in the network layer 130. Moreover, in some embodiments, the IoT platform 121 controls, or otherwise executes, aspects of the peer sensor interrogation techniques described herein. As an example, the IoT platform 121 may provide a graphical user interface (GUI) that can be used by a person responsible for configuring the IoT platform architecture 100, such as a system administrator, to selectively configure the arrangement of primary sensors and peer sensors, as illustrated in sensor pairs 134, 135, and 136. Thus, the IoT platform 121 can delegate sensors 131b, 132b, and 133b to act as peer sensors, and subsequently interrogate those sensors in accordance with the disclosed techniques.

The IoT platform 121 can manage IoT devices (or the respective sensors embedded therein) of network layer 130, illustrated as including sensor pairs, 134, 135, and 136. In some cases, the IoT platform 121 can be implemented on a server that resides in the cloud, (e.g., a network of servers that operate and/or communicate with each other to effectuate a single ecosystem). A public cloud may share publicly available resources/services over a network, (e.g., the Internet), while a private cloud is not shared and may only offer resources/services over a private data network. A hybrid cloud may share services between public and private clouds depending on the purpose of the services.

With reference to the IoT devices, shown as sensor pairs 134, 135, and 136, there can be difficulty in estimating the accuracy of the data obtained from these devices. In some instances, the IoT platform 121 can have a limitation with respect to the number of sensors that can be supported at any given time. Consequently, there may not be a limitless number of IoT devices that can be used by the IoT platform 121 for the purposes of data collection. Furthermore, due to the abovementioned restriction, there is greater significance in data from the available IoT devices being consistently accurate. However, in many real world applications, it is probable that there will be instances when data received from the IoT devices and sensors will be inaccurate. These inaccuracies may be a result of various faults, including but not limited to: communication errors, catastrophic sensor failures, temporary sensor malfunctions, and the like. As an example, sensor device 131a may be functioning properly (e.g., correctly calibrated) and obtaining accurate sensor measurements. However, there may be a poor wireless link established between the sensor device 131a and the IoT platform 121, causing there to be faulty data that is streamed to the IoT platform 121. This inaccurate data may ultimately be received by the application 111, even in spite of the proper calibration of sensor 131a.

Some brute force solutions currently exist to address inaccurate data that may be collected and communicated within an IoT system. For instance, recalibrating sensors can correct for many scenarios where inaccuracies stem from the degradation of the sensors over time. Nonetheless, in system where the number of sensors used is on the order of millions of devices, recalibrating can be a cumbersome and time consuming approach. Furthermore, leaks in the calibration will still impact the results after calibration is complete. Even further, many conventional IoT system are still subject to the limitations of employing a single sensor at any given data collection point, such as single point failures. In comparison to an example of the embodiments in FIG. 1, conventional IoT systems may use re-calibration, but a peer sensor, for example sensor device 131b, may not be present. Accordingly, if the re-calibrated sensor device (in an convention IoT system) starts to send faulty data again, even after being recalibrated, then the system will suffer the impact from only receiving inaccurate data from the data collection point associated with sensor device. However, the embodiments include an arrangement where a sensor, such as sensor 131a and at least one peer sensor, sensor 131b, can be proximately located at the same collection point, providing redundancy that can mitigate single point failures.

Alternatively, there are other brute force solutions that exist, which involve deploying a considerably large amount of sensors within the IoT network. In general, the underlying concept in distributing an excessively large number of sensors throughout the network is to provide enough data, for example from billions of sensors, to make inaccurate data from a single sensors (or small number of sensors) effectively negligible. This approach may be sufficient to address concerns with respect to inaccurate data (e.g., small scale) and single point failures, but may lead to other problems associated with having such a device-dense network. Employing such a large number of sensors in an IoT network, in turn, yields a considerable increase in the network traffic between the network layer 130 and the IoT platform 121. This increase in network traffic can cause a number of related issues, including but not limited to: increased computations; increased storage; increased power consumptions; increase costs; and the like. In some cases, this approach may cause a degradation in the performance of the IoT platform 121, because of the excessive amount of processing resources that must be allocated for the high density of sensors.

The peer sensor interrogation approach, as disclosed throughout, provides a more optimized solution. In the illustrated example of FIG. 1, the IoT platform 121 may utilize the peer sensor technique to interrogate one or more of the peer sensors of the IoT platform architecture 100, such as sensor device 131b, sensor device 132b, and sensor device 133b, to validate data from its corresponding primary sensor, only as needed. Restated, peer sensors 131b, 132b, and 133b are predominately used for data reliability. In contrast, the primary sensors in the architecture 100 operate in a nominal manner that is consistent with most IoT-based data collection functions. For example, sensor devices 131a, 132a, and 133a can transmit its measured data to the IoT platform 121 in a more continuous and/or frequent manner, as compared to their peer sensor. As such, the embodiments mitigates inaccurate data collected that may be obtained from IoT sensors by also collecting supplemental data from peer sensors. Even further, embodiments not only provide redundancy amongst IoT sensors that can mitigate the potential drawbacks of single point architecture, but also uses a sophisticated approach that does so in a manner that optimizes the amount of sensors and data needed to achieve enhanced data reliability.

Figure 2A:
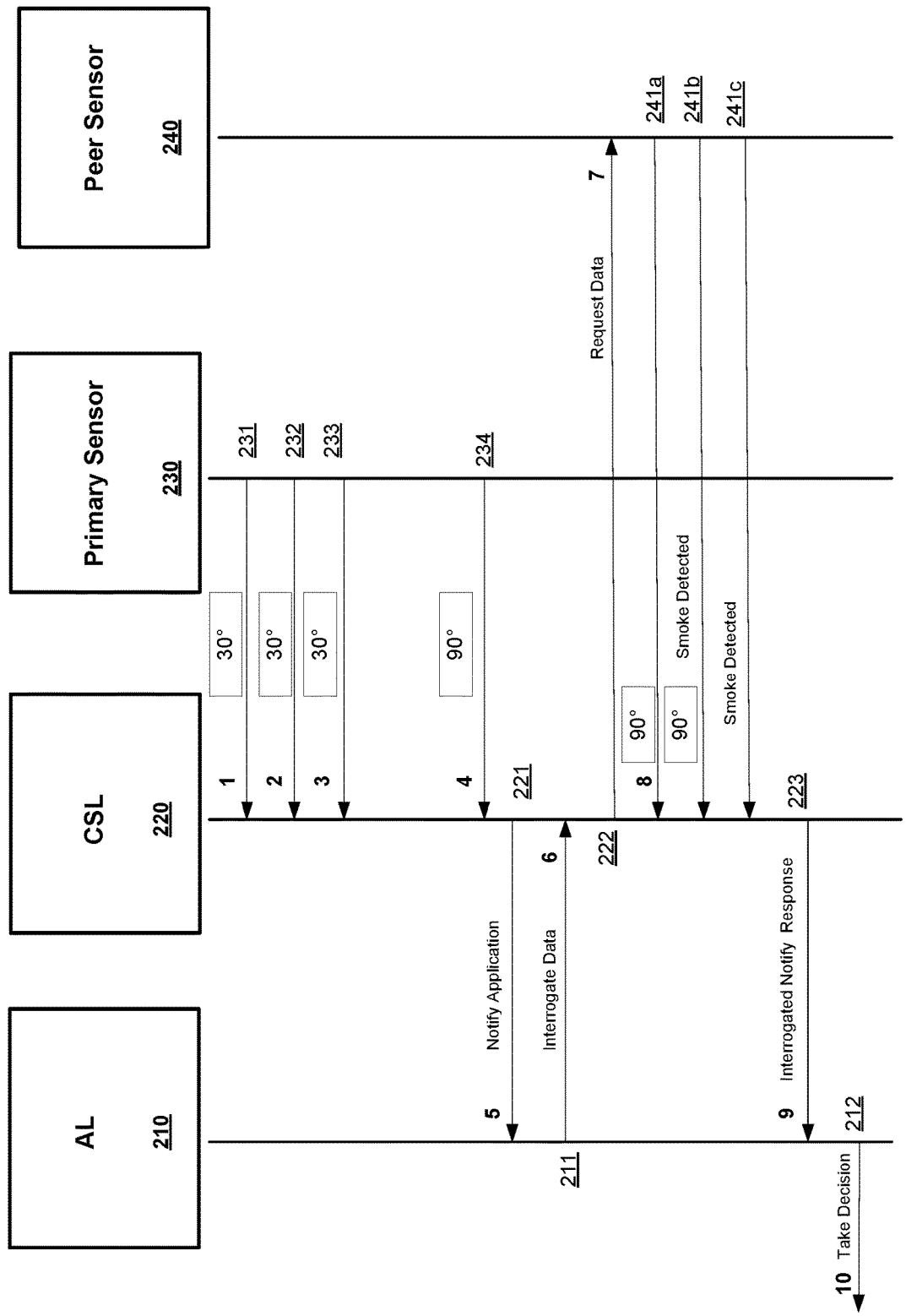
FIGS. 2A-2B illustrate an example of a message flow between entities of the IoT platform architecture shown in FIG. 1 communicating in accordance with peer sensor interrogation techniques for data reliability, according to some embodiments.
Figure 2B:
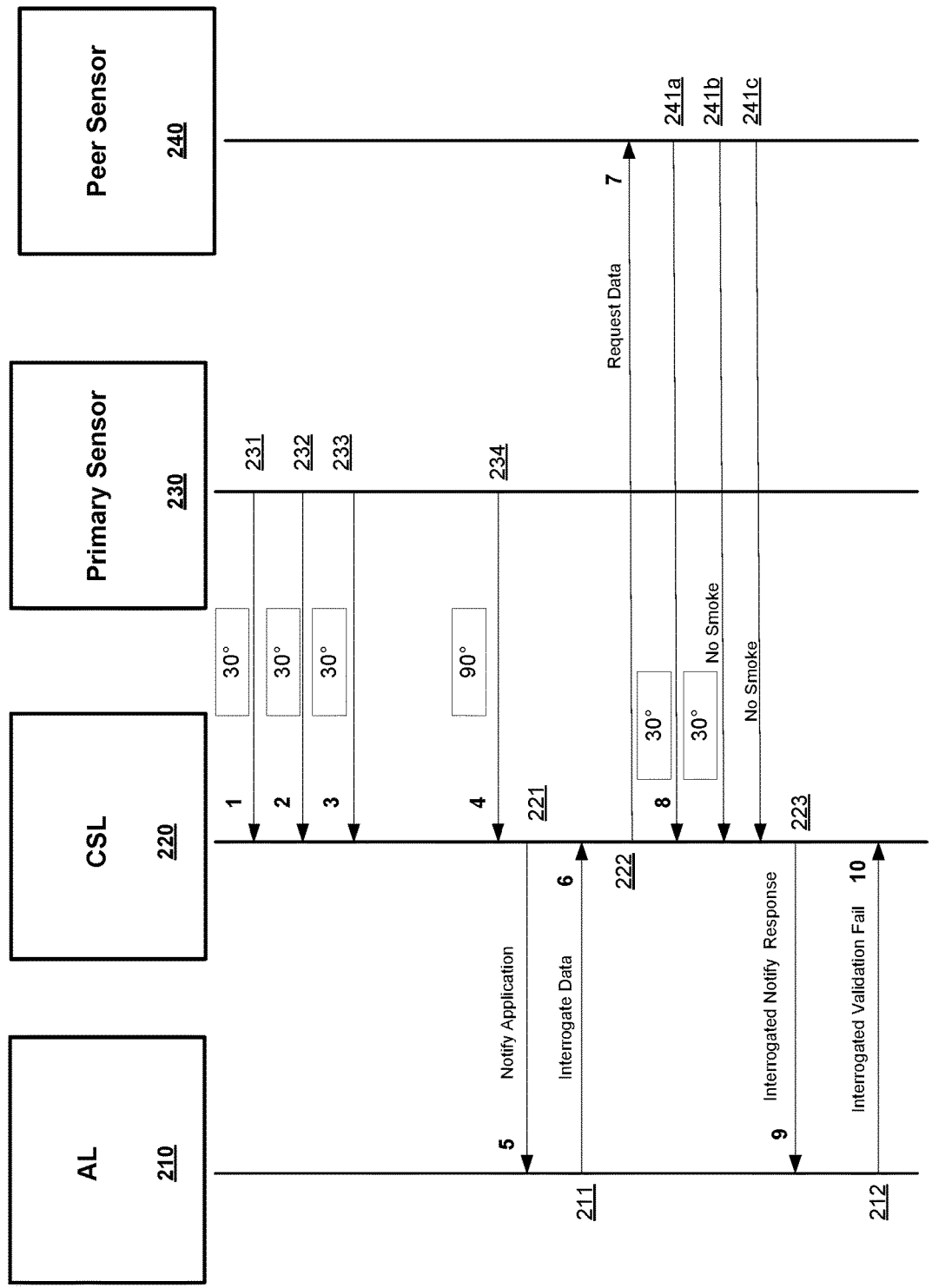

Now referring to FIGS. 2A-2B, an example of a message flow between entities of the IoT platform architecture of FIG. 1 is shown. These entities shown in FIGS. 2A-2B are communicating in accordance with the peer sensor interrogation techniques for data reliability, as disclosed herein. In an example environment for the message flows of FIG. 2A-2B, an IoT system can be placed and implemented for in a building to operate as a fire detection system. Thus, in the illustrated example, the primary sensor 230 and peer sensor 240 can possess capabilities related to fire detection, such as temperature measuring capabilities, smoke detection capabilities, and the like. Furthermore, the application layer (AL) entity 210 can be an application program on a mobile device, such as tablet computer, that is used to remotely monitor various areas in the building for indications of a fire (e.g., extreme high temperatures, presence of smoke). The AL entity 210 can regularly receive sensor data from the primary sensor 230 that may be positioned at a location in the building that is deemed appropriate for detecting a fire, such as near an elevator. Based on the measurements collected by the primary sensor 230, the AL entity 210 determines whether the sensor data is sufficient to indicate that there is a fire somewhere in the building. In the event that the AL entity 210 deems that a fire has been detected, it may be configured to automatically perform associated emergency actions, such as alerting any occupants in the building (e.g., fire alarm), notifying emergency responders (e.g., fire, hospital, and police), and the like. Nonetheless, as alluded to above, inaccurate data may be received from an IoT device, for any one of a myriad of causes. Thus, there is the potential for the AL entity 210 to receive faulty data from primary sensor 230, which subsequently leads to an error in its critical decision, and causing a false alarm, such as triggering a fire alarm when there is no fire in the building.

In detail, FIG. 2A shows that the primary sensor 230 can transmit data that is obtained using its corresponding sensor capabilities to common service layer (CSL) entity 220. In this example, the primary sensor 230 has temperature sensing capabilities, allowing it to measure the temperature of its environment in a surrounding area. At message flow 231, the primary sensor 230 sends its sensor data to CSL entity 220, which is a first temperature measurement 30° C. that it obtained. At message flows 232 and 233, the primary sensor 230 sends its next sensor data to CSL entity 220, which are subsequent temperature measurements, also of 30° C., that it has obtained from the surrounding environment. In some cases, the primary sensor can passively (e.g., without queries and/or interrogation) send its sensor data synchronously at specified time intervals to CSL entity 220.

According to various embodiments, the CSL entity 220, may be an IoT platform that is equipped with some functionality that is intended to be collaborative with (or manage) the operation of the application program running on AL entity 210. In this example, the CSL entity 220 can be configured to employ an initial threshold to perform a comparison using the sensor data that is received from primary sensor 230. The CSL entity 220 can compare the temperatures received at flows 231, 232, and 233, to a threshold temperature, 40° C. for example, to determine whether the data is approaching a critical condition, or otherwise outside of expected values. In the example, at flow 234, the primary sensor 230 sends another temperature measurement 90° C. that it has obtained to CSL entity 220. Thereafter, the CSL entity 220 may compare the temperature indicated by the received sensor data to the threshold, and determine that it is higher than the threshold temperature of 40° C. Accordingly, as the threshold has been met or exceeded, the CLS entity 220 notifies the AL entity 210. FIG. 2A shows that the CSL entity 220 sends a notification message to AL entity 210 at flow 221.

Based on being notified of a potential critical event, and in accordance with the disclosed techniques, the AL entity 210 may interrogate the peer sensor 240 for supplemental sensor data, as a data validation protocol. It is an important aspect of the embodiments that the peer sensor 240 is interrogated prior to executing any response actions for the critical event, thereby validating the data used in any critical decision making by AL entity 210. At flow 211, the AL 210 sends an interrogation message to CSL entity 220 to receive supplemental data in order to confirm the suspected critical event. Upon receiving the interrogation message, the CSL entity 220, in turn, effectuates a request message that is sent to peer sensor 240.

An aspect of the peer interrogation techniques involves the deployment of peer sensors. In an embodiment, peer sensor 240 may be paired with the primary sensor 230 due to the fact that the devices share the same capabilities. For instance, the peer sensor 240 and the primary sensor 230 can be of the same device type. In reference to the example of FIG. 2A, the primary sensor 230 and peer sensor 240 may both include temperature measuring capabilities. In this case, at flow 241a (e.g., after receiving the request message at flow 222) the peer sensor 240 may also transmit a temperature measurement that it has obtained to the CSL entity 220.

In another embodiment, the peer sensor 240 may be paired with primary sensor 230 because the peer sensor 240 has, what is deemed as, supplemental capabilities which compliments the function of the primary sensor 230. That is, the sensor capabilities can obtain different data types that are related to one another based on a common objective. For instance, the peer sensor 240 can possess smoke detecting capabilities, which compliments the temperature measuring capability of the primary sensor 230 for the purposes of detecting a fire. Thus, the peer sensor 240 can provide supplemental data that may be different from the initial sensor data provided by the primary sensor 230, but can be used in conjunction with that initial sensor data for validation. Thus, at message flow 241b, the peer sensor 240 can send a message indicating "smoke detected" in addition to an indication of its temperature reading (in the scenario where peer sensor 240 has both temperature measuring and smoke detection capabilities) to CSL entity 220. Additionally, at message flow 241c, the peer sensor 240 can send a message that only indicates "smoke detected" (in the scenario where peer sensor 240 has only the smoke detection capabilities) to CSL entity 220.

As a result of receiving the supplemental data from the peer sensor 240, the CSL entity 220 can forward the interrogation response to the AL entity 210 at flow 223. In FIG. 2A, the AL entity 210 can determine that there is a convergence between the sensor data received by the primary sensor 230, and the sensor data received by the peer sensor 240. That is, the same 90° C. temperature is confirmed by the peer sensor 240. And, in some cases, smoke has been detected, which is an additional indication of the presence of a fire in the building. In this scenario, the AL entity 210 can take the decision, as the sensor data has been validated, which further confirms the critical event. Thus, after taking the action at flow 212, the AL entity may execute the response actions, such as engaging the fire alarm.

In contrast, FIG. 2B shows a case where the data from peer sensor 240 does not converge with the initial sensor data received from primary sensor 230. As seen, the peer sensor 240 transmits a temperature reading of 30° C. at flows 241a, and 241b. Furthermore, the peer sensor 240 transmits a message that include an indication of "no smoke" at flows 241b, and 241c. The sensor data of peer sensor 240 differs from the initial sensor data obtained from primary sensor 230 in a manner that signifies that the primary sensor 230 has communicated inaccurate data at flow 234. For example, the primary sensor 230 may be need to be recalibrated due to some degradation it may have experience after flow 233. Subsequently, the AL entity 210 determines that the sensor data from primary data 230 is invalid, and sends a validation fail message to the CSL entity 220 at flow 212. In some cases, the AL entity 210 also considers that critical condition associated with the initial sensor data at flow 234 (e.g., triggering the critical event) to be unconfirmed, and thus does not perform any response actions.

Figure 3:
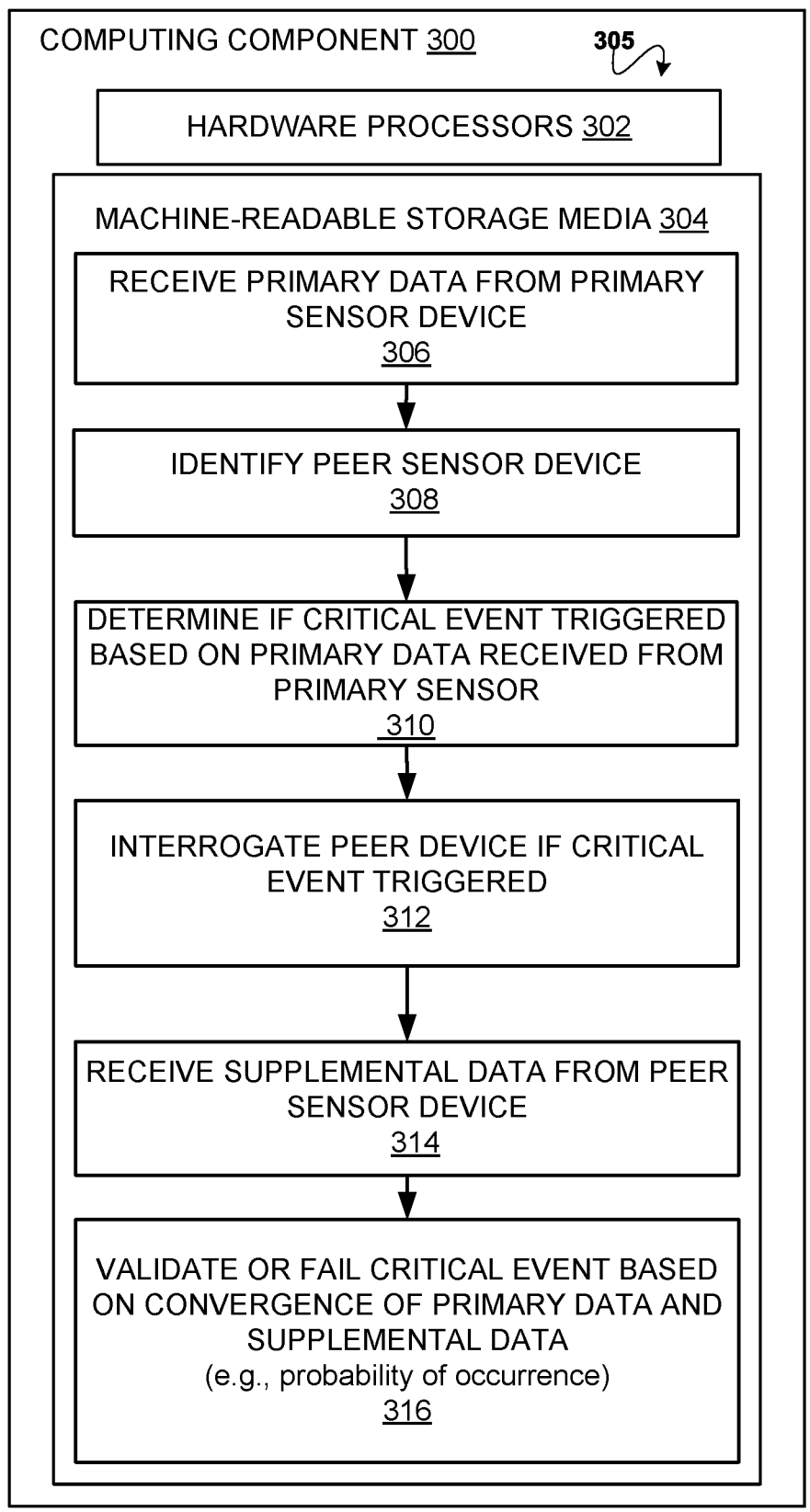
FIG. 3 is an operational flow diagram illustrating an example of a process used to implement the peer sensor interrogation techniques for data reliability, according to some embodiments.

Further details of the peer interrogation technique for data reliability are now described with reference to FIG. 3, which illustrates an example of a process 305 according to one embodiment of the systems and methods described herein. As illustrated in FIG. 3, process 305 is illustrated as a series of executable operations in a machine-readable storage media 304 performed by a hardware processor 302. The computing component 300 can be a computer system implementing the IoT platform shown in FIG. 1.

In an operation 306, primary data, which is sensor data that is obtained by a primary sensor device, is received. In some cases, an IoT network can include a plurality of first sensors devices, which are designated to operate as primary sensor devices, as described above. For example, the primary sensor can be a sensor that has been selected from amongst the plurality of primary sensors on the IoT network, by a particular application that is a consumer of data collected by devices on IoT network. Therefore, the primary sensor collected data in accordance with the associated application program. Also, a plurality of second sensor devices can be deployed in the IoT network which operate as peer sensors as described herein. According to some embodiments, each primary sensor is paired with at least one peer sensor. The deployment/pairing aspects of the embodiments can be a manual deployment, where peer devices are user selected then placed proximally, or co-located, with its corresponding primary sensor. In some cases, the sensor deployment/pairing between is accomplished by the system. It should be appreciated that although primary-peer pairs are described for purposes it illustration, that the embodiments are not intended to be limited to this structure, and any number of peer devices can be associated with a primary device as deemed appropriate. For instance, a primary sensor may correspond to two or more peer sensors. In some cases, a middleware platform, such as the IoT platform (shown in FIG. 1) which is communicative coupled to the IoT network, including all of the primary sensors and peer sensors, receives the primary data from the primary sensor.

In an operation 308, a peer sensor device can be identified that is associated with the selected primary sensor. The peer sensor can be identified from the plurality of second sensor devices previously mentioned. In some cases, any device that is currently operating as a primary sensor cannot be identified as a peer. As alluded to above, the peer sensor can be selected to be paired with a corresponding primary sensor, based on its capabilities. A sensor, for instance, may be identified as a peer because it shares common sensor capabilities with a primary sensor. The peer sensor can be identified based on having at least one additional capability that is considered supplementary to, or that compliments, the capabilities of the selected primary sensor device. As an example in the agriculture environment, a primary sensor may be able to sense the moisture in soil. A peer may be identified as a sensor that is capable of measuring humidity.

In an operation 310, it can be determined whether a critical even is triggered based on the primary data received from the primary sensor devices. Operation can involve a threshold, as described in detail above in reference to FIG. 2A. Furthermore, the particular critical event can be application-specific. Referring again to the fire detection example discussed above, the critical even can be detecting a temperature that is over a threshold. According to the embodiments, a critical event can be any analysis, action, or condition that is linked to critical decision making using the collected sensor data from the IoT network. Also, in some embodiments, determining that a critical event has been triggered involves notifying (e.g., transmitting a notification message) the application that the critical event is suspected. Alternatively, if there is no critical event triggered, normal IoT-based data collection from the primary sensors can continue.

In the event that the critical even has been triggered, operation 312 can involve interrogating the peer sensor device. The primary sensor has the potential to degrade, or experience a fault that may cause it to transmit inaccurate data to the system. In accordance with the peer interrogation techniques, the occurrence of a critical event invokes interrogation of a peer sensor's peer, as a validation protocol to ensure that the critical event is not based on inaccurate data. The interrogation can include transmitting an interrogation message from the middleware to the peer sensor. In some cases, the interrogate message can enable the peer sensor to execute its capabilities to obtain the necessary supplemental sensor data (e.g., power on, collect data, transmit collected data). Interrogating the peer sensor, in order to ultimately confirm the critical event, is performed prior to the application executing a response action for the critical event. Thus, the peer interrogation techniques can prevent emergency action, such as fire alarms, and calling police unnecessarily (e.g., due to a false positive in critical event detection).

Next, at operation 314, in response to the peer being interrogated, supplemental data is received from the peer sensor device. According to the embodiments, the peer sensors do not actively transmit sensor data under normal IoT operations, and are used only for the purposes of revalidation and data reliability. Accordingly, the embodiments realize a solution that avoids drawbacks associated with increased network traffic and the additional storage and processing resources needed (as associated with the brute force approaches discussed above), such as reduced infrastructure costs. Furthermore, the performance of the IoT platform can be improved by interrogating the peer sensors, as compared to some existing approaches, as the techniques reduce the overall size of the network and the network overhead.

Subsequently, at operation 316, the supplemental data from the peer sensor can be used to either validate or fail the critical event. Operation 316 can include analyzing the primary data and the supplemental data to ascertain whether the data converges. If the sensor data provided by the primary sensors and the sensor data provided by the peer sensor converges, it can signify validation that the primary data is accurate. The reliability of the sensor data, due to being validated, also serves as confirmation of the critical event. In contrast, if the primary data and supplemental data diverges, then the critical event generated by the primary sensor has failed validation vis-à-vis the invalid sensor data. Data convergence (or divergence) can be based on any mathematical principal, algorithm, or analysis that can determine whether the data, although obtained from different sensors, is approaching towards the same result (indicating similar conditions). Conversely, analysis may show that the sensor data diverges to different results (indicating separate conditions). In this case, divergence sensor data is also indicative of the primary data being inaccurate. Thus, in some instances, actions may be performed to recover the primary sensor from error in an effort to return the sensor to its proper functions.

In some instances, the validation or failure of the critical event is based on a probability of occurrence, that can be ascertained by a degree of convergence (or divergence) between the supplement data received by the peer sensor and the primary data received from the primary sensor. As an example, a high degree of divergence between supplemental data and primary data may lead to a very low probability of occurrence for the critical event. In some embodiments, the system executes actions only in response to validating the critical event. Thus, the overall reliability of the IoT system can be improved, in accordance with the disclosed peer interrogation techniques.

Figure 4:
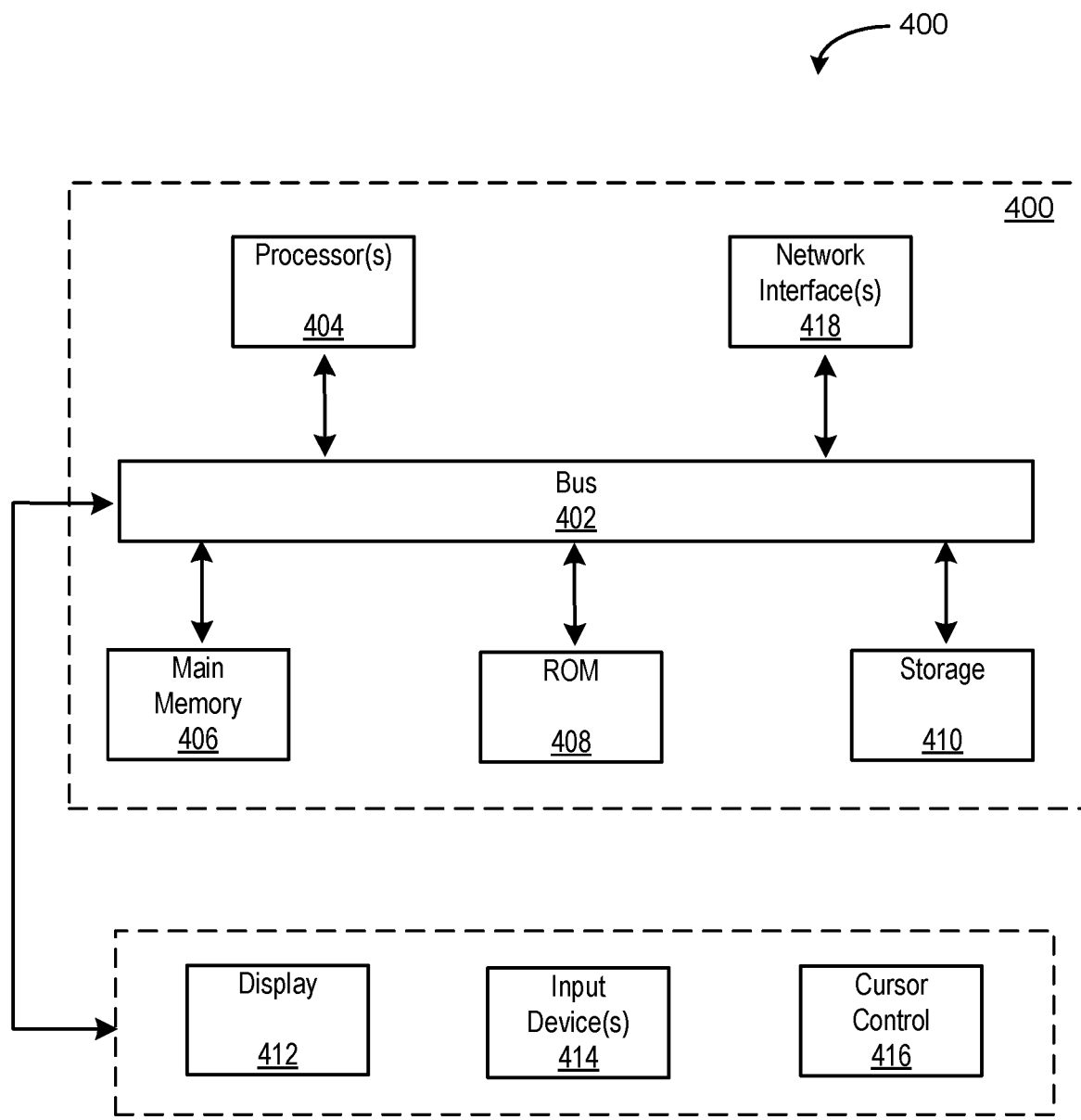
FIG. 4 illustrates an example computer system that may be used in implementing peer sensor interrogation techniques for data reliability relating to the embodiments of the disclosed technology.

FIG. 4 depicts a block diagram of an example computer system 400 in which the peer sensor interrogation techniques embodiments described herein may be implemented. Furthermore, it should be appreciated that although the various instructions are illustrated as being co-located within a single processing unit, in implementations in which processor(s) includes multiple processing units, one or more instructions may be executed remotely from the other instructions.

The computer system 400 includes a bus 402 or other communication mechanism for communicating information, and one or more hardware processors 404 coupled with bus 402 for processing information. Hardware processor(s) 404 may be, for example, one or more general purpose microprocessors.

The computer system 400 also includes a main memory 408, such as a random-access memory (RAM), cache and/or other dynamic storage devices, coupled to bus 402 for storing information and instructions to be executed by processor 404. Main memory 408 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions. The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor 404 may be programmed by one or more additional instructions that may perform some or all of the functionality attributed herein to one of the instructions.

The computer system 400 further includes storage device 410. The various instructions described herein, including the disclosed parameter sharing aspects, may be stored in a storage device 410, which may comprise read only memory (ROM), and/or other static storage device coupled to bus 402 for storing static information and instructions for processor 404. A storage device 410, such as a magnetic disk, optical disk, or USB thumb drive (Flash drive), etc., is provided and coupled to bus 402 for storing information and instructions. The storage device 410 may store the computer program instructions (e.g., the aforementioned instructions) to be executed by processor 404 as well as data that may be manipulated by processor 404. The storage device may comprise one or more non-transitory machine-readable storage media such as floppy disks, hard disks, optical disks, tapes, or other physical storage media for storing computer-executable instructions and/or data.

The computer system 400 may be coupled via bus 402 to a display 412, such as a liquid crystal display (LCD) (or touch screen), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. In some embodiments, the same direction information and command selections as cursor control may be implemented via receiving touches on a touch screen without a cursor.

The computing system 400 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor(s) 404 executing one or more sequences of one or more instructions contained in main memory 408. Such instructions may be read into main memory 408 from another storage medium, such as storage device 410. Execution of the sequences of instructions contained in main memory 408 causes processor(s) 404 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 408. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 402. Transmission media can also take the form of acoustic or light waves, such as those generated during radio-wave and infra-red data communications.

The computer system 400 also includes a communication interface 418 coupled to bus 402. Network interface 418 provides a two-way data communication coupling to one or more network links that are connected to one or more local networks. For example, communication interface 418 may be an integrated service digital network (ISDN) card, cable modem, satellite modem, or a modem to provide a data communication connection to a corresponding type of telephone line. As another example, network interface 418 may be a local area network (LAN) card to provide a data communication connection to a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. Wireless links may also be implemented. In any such implementation, network interface 418 sends and receives electrical, electromagnetic or optical signals that carry digital data streams representing various types of information. The nodes of the decentralized model building system, as disclosed herein, may be coupled to other participant nodes via the abovementioned networks.

A network link typically provides data communication through one or more networks to other data devices. For example, a network link may provide a connection through local network to a host computer or to data equipment operated by an Internet Service Provider (ISP). The ISP in turn provides data communication services through the world-wide packet data communication network now commonly referred to as the "Internet." Local network and Internet both use electrical, electromagnetic or optical signals that carry digital data streams. The signals through the various networks and the signals on network link and through communication interface 418, which carry the digital data to and from computer system 400, are example forms of transmission media.

The computer system 400 can send messages and receive data, including program code, through the network(s), network link and communication interface 418. In the Internet example, a server might transmit a requested code for an application program through the Internet, the ISP, the local network and the communication interface 418.

The received code may be executed by processor 404 as it is received, and/or stored in storage device 410, or other non-volatile storage for later execution.

The various processes, methods, operations and/or data flows depicted in FIG. 4 (and in the other drawing figures) described in the preceding sections may be embodied in, and fully or partially automated by, code components executed by one or more computer systems or computer processors comprising computer hardware. The processes and algorithms may be implemented partially or wholly in application-specific circuitry. The various features and processes described above may be used independently of one another or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 400.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system, comprising:
    a plurality of first sensor devices for collecting data in accordance with an application program;

a plurality of second sensor devices for collecting supplemental data in accordance with the application program, wherein each of the plurality of second sensor devices corresponds to one of the plurality of first sensor devices; and a middleware platform coupled to the plurality of first sensors devices and the plurality of second sensor devices, wherein the middleware platform is configured to:

receive data from a selected sensor device of the plurality of first sensor devices in accordance with the application program;

identify a second sensor device of the plurality of second sensor devices that respectively corresponds to the selected sensor device as a peer sensor, wherein operating as the peer sensor comprises collecting the supplemental data in response to an interrogation message;

determine whether the received data from the selected sensor device triggers a notification of a critical event in accordance with the application program, and upon determining that the received data from the selected sensor device triggers a notification for a critical event, transmitting an interrogation message to the identified second sensor device to confirm the critical event;

receive supplemental data collected from the second sensor device operating as the peer sensor; and determine whether the critical event is confirmed, wherein the event is confirmed by determining a convergence of the received data from the selected sensor device and the supplemental data from the second sensor device operating as the peer sensor.

2. The system of claim 1, wherein transmitting the interrogation message is performed prior to the application program executing a response action associated with the critical event.

3. The system of claim 2, wherein the response action is executed by the application program upon determining that the critical event is confirmed.

4. The system of claim 1, wherein the plurality of first sensor devices and the plurality of second sensor devices comprises Internet of Things (IoT) devices and the middleware platform is an IoT platform.

5. The system of claim 1, wherein each of the plurality of second sensor devices corresponds to one of the plurality of first sensor devices based on at least one common sensor capability, the common sensor capability enabling the second sensor device to operate as the peer sensor.

6. The system of claim 5, wherein the data from a selected sensor device and the supplemental data collected from the second sensor device are of the same data type.

7. The system of claim 5, wherein the data from the selected sensor device and at least a portion of the supplemental data collected from the second sensor device are of the same data type.

8. The system of claim 5, wherein the second sensor device has additional sensor capabilities that are supplementary to the capabilities of the selected sensor device, the additional capabilities sensor capabilities enabling the second sensor device to operate as the peer sensor.

9. The system of claim 8, wherein the data from the selected sensor device and at least a portion of the supplemental data collected from the second sensor device are of the same data type and another portion of the supplemental data collected from the second sensor device is of another data type based on the additional sensor capabilities of the second sensor device.

10. The system of claim 1, wherein each of the plurality of second sensor devices corresponds to one of the plurality of first sensor devices based on at least one supplemental sensor capability that is supplementary to the capabilities of the selected sensor device, the supplemental sensor capability enabling the second sensor device to operate as the peer sensor.

11. The system of claim 10, wherein the data from the selected sensor device and the supplemental data collected from the second sensor device are of different data types.

12. A method of performing enhanced data reliability, the method comprising:

selecting a sensor device from a plurality of sensor devices communicatively connected to an Internet of Things (IoT) platform, wherein the selected sensor device has at least on sensor capability utilized with an application program;

receiving data from the selected sensor device in accordance with the application program;

identifying a second sensor device of the plurality of second sensor devices that respectively corresponds to the selected sensor device and has at least one sensor capability that is the same as a sensor capability of the selected sensor device, the at least one sensor capability that is common to both the selected sensor device and the second sensor device enabling the second sensor to operate as a peer sensor, wherein operating as the peer sensor comprises collecting the supplemental data in response to an interrogation message using the sensor capability that is common to both the selected sensor device and the second sensor device;

determining whether the received data from the selected sensor device triggers a notification of a critical event in accordance with the application program;

upon determining that the received data from the selected sensor device triggers a notification for a critical event, transmitting an interrogation message to the identified second sensor device to confirm the critical event;

receiving supplemental data collected from the second sensor device operating as the peer sensor; and determining whether the critical event is confirmed, wherein the event is confirmed by determining a convergence of the received data from the selected sensor device and the supplemental data from the second sensor device operating as the peer sensor.

13. The method of claim 12, wherein transmitting the interrogation message is performed prior to the application program executing a response action associated with the critical event and based on determining that the critical event is confirmed.

14. The method of claim 12, wherein the plurality of first sensor devices and the plurality of second sensor devices comprise Internet of Things (IoT) devices.

15. The method of claim 14, wherein each of the plurality of second sensor devices corresponds to one of the plurality of first sensor devices based on at least one common sensor capability that is associated with both the respective second sensor device and the corresponding first sensor device, the common sensor capability enabling the second sensor device to operate as the peer sensor for the corresponding first sensor device.

16. The method of claim 15, wherein the data from a selected sensor device and the supplemental data collected from the second sensor device are of the same data type.

17. The method of claim 15, wherein the data from the selected sensor device and at least a portion of the supplemental data collected from the second sensor device are of the same data type.

18. The method of claim 17, wherein the data from the selected sensor device and at least a portion of the supplemental data collected from the second sensor device are of the same data type and another portion of the supplemental data collected from the second sensor device is of another data type based on an additional sensor capability of the second sensor device.

19. The method of claim 14, wherein each of the plurality of second sensor devices corresponds to one of the plurality of first sensor devices based on at least one supplemental sensor capability that is supplementary to the capabilities of the selected sensor device, the supplemental sensor capability enabling the second sensor device to operate as the peer sensor.

20. The method of claim 19, wherein the data from the selected sensor device and the supplemental data collected from the second sensor device are of different data types.

* * * * *